US 8,201,359 B1

(12) United States Patent
Bryan, Jr.

(10) Patent No.: US 8,201,359 B1
(45) Date of Patent: Jun. 19, 2012

(54) PLANT PROTECTION SYSTEM

(76) Inventor: William G. Bryan, Jr., Crystal River, FL (US)

(*) Notice: Subject to any disclaimer, the term of this patent is extended or adjusted under 35 U.S.C. 154(b) by 0 days.

(21) Appl. No.: 13/317,064

(22) Filed: Oct. 7, 2011

(51) Int. Cl.
*A01G 13/02* (2006.01)

(52) U.S. Cl. .................. 47/22.1; 47/29.5; 47/20.1

(58) Field of Classification Search ............ 47/22.1, 47/20.1, 23.1, 23.2, 29.1, 29.2, 29.5; *A01G 13/00, A01G 13/02*
See application file for complete search history.

(56) References Cited

U.S. PATENT DOCUMENTS

| | | | | |
|---|---|---|---|---|
| 1,155,313 A | * | 9/1915 | Hogan | 47/23.2 |
| 1,820,040 A | * | 8/1931 | Zuckerman | 47/23.3 |
| 7,637,053 B1 | * | 12/2009 | McAnulty | 47/23.1 |
| 2003/0009936 A1 | * | 1/2003 | Hodson | 47/29.1 |
| 2005/0172548 A1 | * | 8/2005 | Bement | 47/23.1 |
| 2006/0185708 A1 | * | 8/2006 | Sylvestre et al. | 135/135 |
| 2009/0293349 A1 | * | 12/2009 | Dunbar | 47/20.1 |
| 2012/0005952 A1 | * | 1/2012 | Lohse et al. | 47/21.1 |

* cited by examiner

*Primary Examiner* — Son T Nguyen
*Assistant Examiner* — Shadi Baniani

(57) ABSTRACT

A shaft in a cylindrical configuration has upper and lower ends and a cylindrical passageway. A housing forms a chamber with an open top and an open bottom. The chamber is in operative communication with the passageway. A sheet has a center, a periphery and a central extent. The sheet has a deployed orientation. The deployed orientation is in a generally hemispherical configuration. The center of the sheet is supported by the housing. The periphery of the sheet is provided adjacent to ground around the shaft. In this manner the plant is covered. The sheet has a stored orientation. The center of the sheet in the passageway is provided adjacent to the lower end. The central extent of the sheet is provided there above.

2 Claims, 3 Drawing Sheets

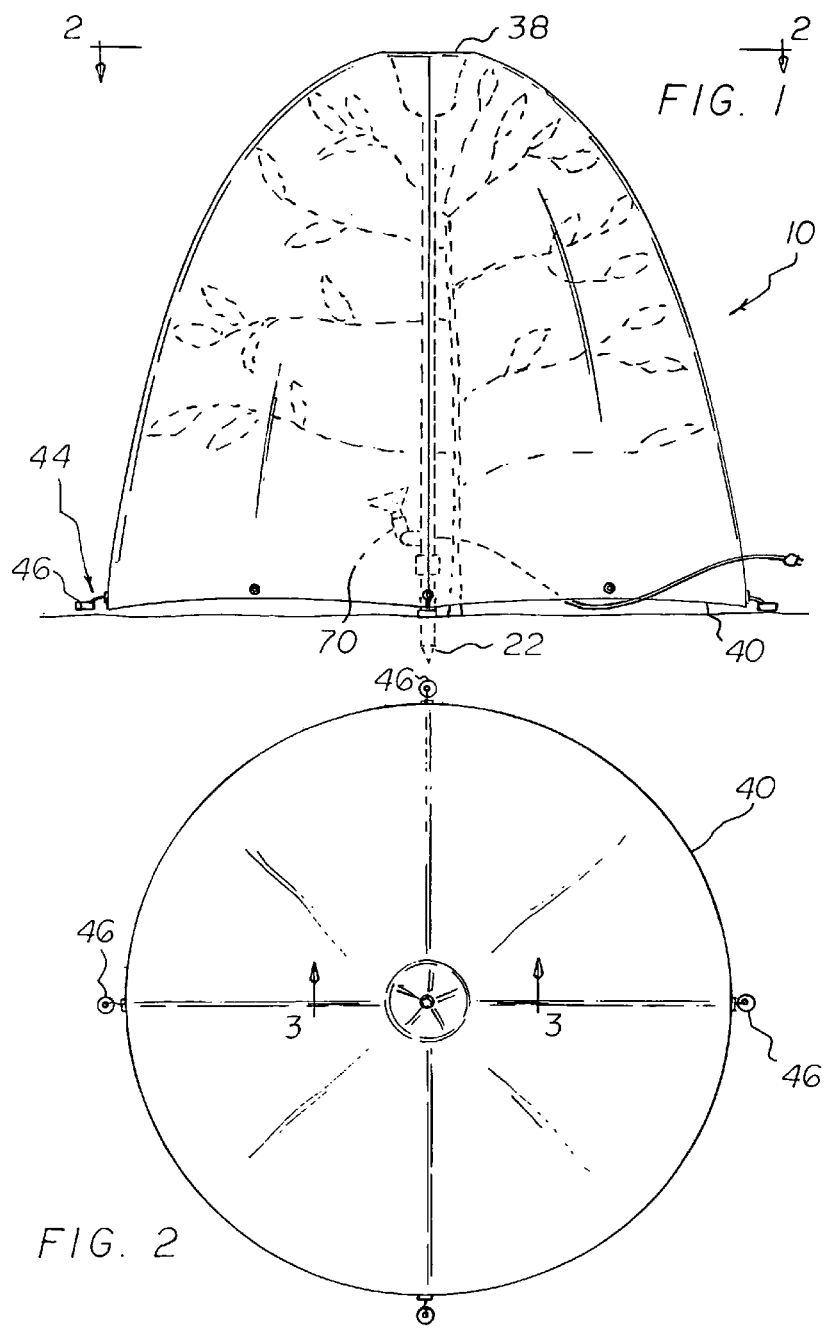

PLANT PROTECTION SYSTEM

BACKGROUND OF THE INVENTION

Field of the Invention

The present invention relates to a plant protection system and more particularly pertains to covering plants during low ambient temperatures and for warming the covered plants to thereby preclude the premature killing of the covered and warmed plants, the covering and warming being done in a safe, reliable, conveniently deployed and economical manner.

SUMMARY OF THE INVENTION

In view of the foregoing disadvantages inherent in the known types of protection systems of known designs and configurations now present in the prior art, the present invention provides an improved plant protection system. As such, the general purpose of the present invention, which will be described subsequently in greater detail, is to provide a new and improved plant protection system and method which has all the advantages of the prior art and none of the disadvantages.

To attain this, the present invention essentially comprises a plant protection system. First provided is a shaft. The shaft is in a cylindrical configuration. The shaft has a linear shaft axis. The shaft has an upper end. The shaft has a lower end. the shaft is hollow. The shaft has a cylindrical passageway. The passageway is provided between the upper and lower ends of the shaft. A spike is provided. The spike has a top. The top of the spike is secured to the lower end of the shaft. The spike has a cone shaped bottom. The bottom is adapted to be inserted into ground adjacent to a plant to be covered and warmed. The spike has a linear spike axis. The axis is provided coaxial with the shaft axis. In this manner when the spike is inserted into the ground the spike will support the shaft vertically. The shaft and spike are fabricated of a rigid plastic polyvinyl chloride.

A housing is provided. The housing is in an inverted frusto-conical configuration. The housing has a chamber. The chamber has a large open top. The chamber has a small open bottom. The chamber is in operative communication with the passageway. The housing is fabricated of a rigid plastic polyvinyl chloride.

A sheet is provided. The sheet has a center. The sheet has a periphery. The sheet has a central extent. The central extent is provided between the center and the periphery. The sheet has a deployed orientation. Note FIG. 1. The deployed orientation is in a generally hemispherical configuration. The center of the sheet is supported by the housing. The periphery of the sheet is adjacent to the ground around the spike. The central extent of the sheet covers the plant. The sheet has a stored orientation. Note FIG. 5. The center of the sheet is provided in the passageway adjacent to the lower end of the shaft and the central extent of the sheet there above. The periphery of the sheet is provided within the chamber.

Deployment mechanisms are provided. The deployment mechanisms include four weights. The four weights have short cords. The short cords are secured to the periphery at equally spaced positions. The weights are positionable in a circle on the ground around the spike and shaft when in the deployed orientation. The weights are positionable in the chamber when in the stored orientation.

Storing mechanisms are provided. The storing mechanisms include a long cord. The long cord has an upper end. The long cord has a washer. The washer couples the upper end of the cord to the center of the cover. The cord has a lower end. The lower end has a spherical handle. The handle is provided exterior of the shaft. The storing mechanisms include a vertical slot. The vertical slot is provided in the shaft adjacent to the lower end. A pulley is provided. The pulley is rotatable in the slot. The cord is trained around the pulley. In this manner the long cord is guided for movement to the stored orientation with the long cord exterior of the shaft and for movement to the deployed orientation with the long cord within the shaft.

A lid is provided next. In this manner the content of the chamber is protected.

Further provided is a lamp. The lamp is secured to the shaft adjacent to the lower end at a location diametric opposite from the slot and the pulley. The lamp faces upwardly. In this manner the plant there above is illuminated and heated.

Provided last is an optional plurality of linear arms. The arms extend generally radially from the shaft. The arms are adapted to support branches of plants of the type requiring support while growing, typical of such plants requiring support are tomato plants.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved plant protection system which has all of the advantages of the prior art protection systems of known designs and configurations and none of the disadvantages.

It is another object of the present invention to provide a new and improved plant protection system which may be easily and efficiently manufactured and marketed.

It is further object of the present invention to provide a new and improved plant protection system which is of durable and reliable constructions.

An even further object of the present invention is to provide a new and improved plant protection system which is susceptible of a low cost of manufacture with regard to both materials and labor, and which accordingly is then susceptible of low prices of sale to the consuming public, thereby making such plant protection system economically available to the buying public.

Even still another object of the present invention is to provide a plant protection system for covering plants during low ambient temperatures and for warming the covered plants to thereby preclude the premature killing of the covered and warmed plants, the covering and warming being done in a safe, reliable, conveniently deployed and economical manner.

Lastly, it is an object of the present invention to provide a new and improved plant protection system. A shaft in a cylindrical configuration has upper and lower ends and a cylindrical passageway. A housing forms a chamber with an open top and an open bottom. The chamber is in operative communication with the passageway. A sheet has a center, a periphery and a central extent. The sheet has a deployed orientation. The deployed orientation is in a generally hemispherical configuration. The center of the sheet is supported by the housing. The periphery of the sheet is provided adjacent to ground around the shaft. In this manner the plant is covered. The sheet has a stored orientation. The center of the sheet in the passageway is provided adjacent to the lower end. The central extent of the sheet is provided there above.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a plant protection system constructed in accordance with the principles of the present invention.

FIG. 2 is a plan view of the system taken along line 2-2 of FIG. 1.

The same reference numerals refer to the same parts throughout the various Figures.

DESCRIPTION OF THE PREFERRED EMBODIMENT

Figure 3:
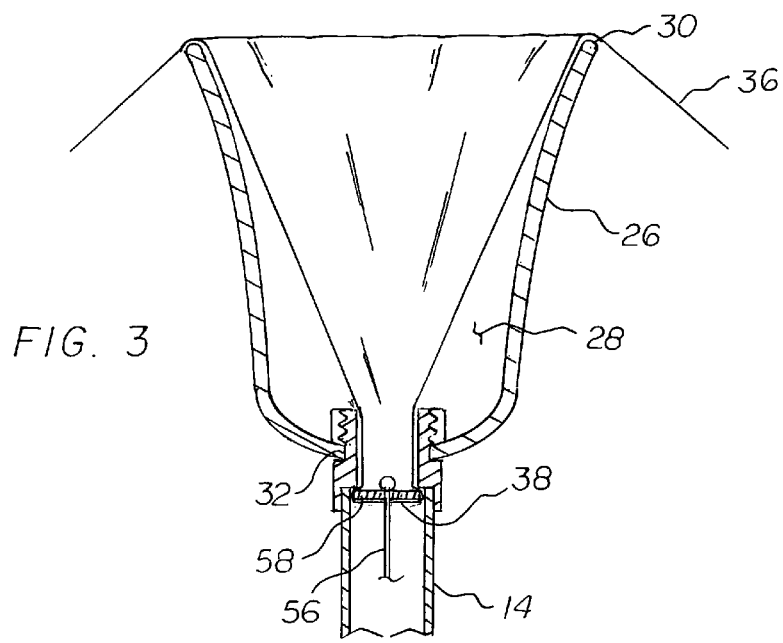
FIG. 3 is a cross sectional view taken along line 3-3 of FIG. 2.
Figure 4:
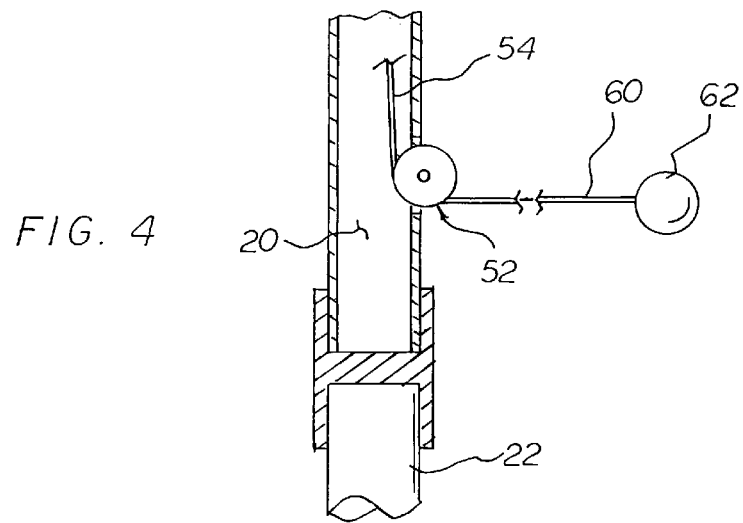
FIG. 4 is a cross sectional view taken along the lower portion of the shaft.

With reference now to the drawings, and in particular to FIG. 1 thereof, the preferred embodiment of the new and improved plant protection system embodying the principles and concepts of the present invention and generally designated by the reference numeral 10 will be described.

The present invention, the plant protection system 10 is comprised of a plurality of components. Such components in their broadest context include a shaft, a housing and a sheet. Such components are individually configured and correlated with respect to each other so as to attain the desired objective.

First provided is a shaft 14. The shaft is in a cylindrical configuration. The shaft has a linear shaft axis. The shaft has an upper end 16. The shaft has a lower end 18. the shaft is hollow. The shaft has a cylindrical passageway 20. The passageway is provided between the upper and lower ends of the shaft. A spike 22 is provided. The spike has a top. The top of the spike is secured to the lower end of the shaft. The spike has a cone shaped bottom. The bottom is adapted to be inserted into ground adjacent to a plant to be covered and warmed. The spike has a linear spike axis. The axis is provided coaxial with the shaft axis. In this manner when the spike is inserted into the ground the spike will support the shaft vertically. The shaft and spike are fabricated of a rigid plastic polyvinyl chloride.

A housing 26 is provided. The housing is in an inverted frusto-conical configuration. The housing has a chamber 28. The chamber has a large open top 30. The chamber has a small open bottom 32. The chamber is in operative communication with the passageway. The housing is fabricated of a rigid plastic polyvinyl chloride.

Figure 5:
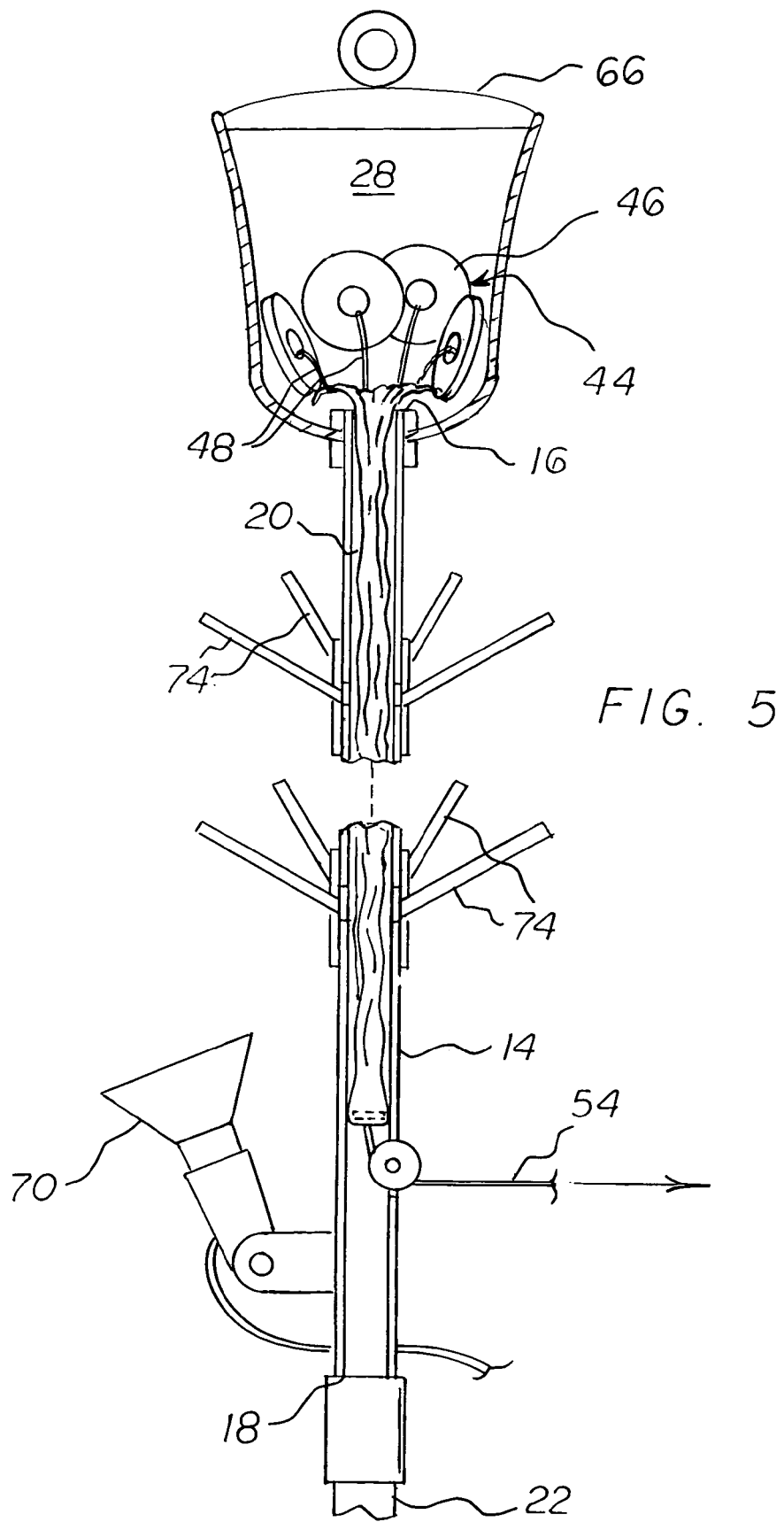
FIG. 5 is a cross sectional view taken along the center line of the housing and shaft.

A sheet 36 is provided. The sheet has a center 38. The sheet has a periphery 40. The sheet has a central extent. The central extent is provided between the center and the periphery. The sheet has a deployed orientation. Note FIG. 1. The deployed orientation is in a generally hemispherical configuration. The center of the sheet is supported by the housing. The periphery of the sheet is adjacent to the ground around the spike. The central extent of the sheet covers the plant. The sheet has a stored orientation. Note FIG. 5. The center of the sheet is provided in the passageway adjacent to the lower end of the shaft and the central extent of the sheet there above. The periphery of the sheet is provided within the chamber.

Deployment mechanisms 44 are provided. The deployment mechanisms include four weights 46. The four weights have short cords 48. The short cords are secured to the periphery at equally spaced positions. The weights are positionable in a circle on the ground around the spike and shaft when in the deployed orientation. The weights are positionable in the chamber when in the stored orientation.

Storing mechanisms 52 are provided. The storing mechanisms include a long cord 54. The long cord has an upper end 56. The long cord has a washer 58. The washer couples the upper end of the cord to the center of the cover. The cord has a lower end 60. The lower end has a spherical handle 62. The handle is provided exterior of the shaft. The storing mechanisms include a vertical slot. The vertical slot is provided in the shaft adjacent to the lower end. A pulley is provided. The pulley is rotatable in the slot. The cord is trained around the pulley. In this manner the long cord is guided for movement to the stored orientation with the long cord exterior of the shaft and for movement to the deployed orientation with the long cord within the shaft.

A lid 66 is provided next. In this manner the content of the chamber is protected.

Further provided is a lamp 70. The lamp is secured to the shaft adjacent to the lower end at a location diametric opposite from the slot and the pulley. The lamp faces upwardly. In this manner the plant there above is illuminated and heated. It should be understood, however, that the lamp is adapted to be of any of a variety of strengths and is adapted to be located at any of a plurality of rotational orientations or elevational heights as might be appropriate for a particular application.

Provided last is an optional plurality of linear arms 74. The arms extend generally radially from the shaft. The arms are adapted to support branches of plants of the type requiring support while growing, typical of such plants requiring support are tomato plants. In this regard, the system of the present invention is readily adapted for use in protecting small growths as well as trees and bushes and the like, whether such protected plants are for providing fruits or vegetables or for providing decoration or any other purpose.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A plant protection system (10) for covering plants during low ambient temperatures and for warming the covered plants to thereby preclude the premature killing of the covered and warmed plants, the covering and warming being done in a safe, reliable, conveniently deployed and economical manner, the system comprising, in combination:
   a shaft (14) in a cylindrical configuration with a linear shaft axis, the shaft having an upper end (16) and a lower end (18), the shaft being hollow with a cylindrical passageway (20) between the upper and lower ends of the shaft, a spike (22) formed with a top secured to the lower end of the shaft, the spike formed with a cone shaped bottom adapted to be inserted into ground adjacent to a plant to be covered and warmed, the spike having a linear spike axis coaxial with the shaft axis whereby when the spike is inserted into the ground the spike will support the shaft vertically, the shaft and spike being fabricated of a rigid plastic polyvinyl chloride;
   a housing (26) in an inverted frusto-conical configuration, the housing forming a chamber (28) with a large open top (30) and a small open bottom (32) in operative communication with the passageway, the housing being fabricated of a rigid plastic polyvinyl chloride;
   a sheet (36) having a center (38) and a periphery (40) with a central extent between the center and the periphery, the sheet having a deployed orientation in a generally hemispherical configuration with the center of the sheet supported by the housing and with the periphery of the sheet adjacent to the ground around the spike and with the central extent of the sheet covering the plant, the sheet having a stored orientation with the center of the sheet in the passageway adjacent to the lower end of the shaft and the central extent of the sheet there above and the periphery of the sheet within the chamber;
   deployment mechanisms (44) including four weights (46) with short cords (48) secured to the periphery at equally spaced positions, the weights positionable in a circle on the ground around the spike and shaft when in the deployed orientation, the weights positionable in the chamber when in the stored orientation;
   storing mechanisms (52) including a long cord (54) with an upper end (56) and a washer (58) coupling the upper end of the cord to the center of the cover, the cord having a lower end (60) with a spherical handle (62) exterior of the shaft, the storing mechanisms including a vertical slot in the shaft adjacent to the lower end, a pulley rotatable in the slot, the cord being trained around the pulley to guide the long cord for movement to the stored orientation with the long cord exterior of the shaft and for movement to the deployed orientation with the long cord within the shaft;
   a lid (66) for the housing to protect the content of the chamber; and
   a lamp (70) secured to the shaft adjacent to the lower end at a location diametric opposite from the slot and the pulley, the lamp facing upwardly to illuminate and heat the plant there above.

2. The system as set forth in claim 1 and further including:
a plurality of linear arms extending generally radially from the shaft, the arms adapted to support branches of plants of the type requiring support while growing.

* * * * *